US008323113B2

(12) United States Patent
Kaminkow et al.

(10) Patent No.: US 8,323,113 B2
(45) Date of Patent: Dec. 4, 2012

(54) GAMING MACHINE WITH IRIDESCENT OR FLUORESCENT INDICIA

(75) Inventors: Joseph E. Kaminkow, Reno, NV (US); Neil D. Falconer, Reno, NV (US); Jamie J. Goins, Reno, NV (US)

(73) Assignee: IGT, Reno, NV (US)

( * ) Notice: Subject to any disclaimer, the term of this patent is extended or adjusted under 35 U.S.C. 154(b) by 947 days.

(21) Appl. No.: 10/120,234

(22) Filed: Apr. 11, 2002

(65) Prior Publication Data

US 2003/0195045 A1 Oct. 16, 2003

(51) Int. Cl.
*A63F 13/08* (2006.01)
*B42D 109/00* (2006.01)
(52) U.S. Cl. ............... 463/46; 463/31; 463/47; 283/85; 283/92
(58) Field of Classification Search ............ 463/16–22, 463/30–31, 47, 46; 273/143 R; 283/85, 283/92; 235/491; 427/157
See application file for complete search history.

(56) References Cited

U.S. PATENT DOCUMENTS

| | | | | |
|---|---|---|---|---|
| 4,565,022 A | * | 1/1986 | Chapin | 40/442 |
| 4,652,464 A | * | 3/1987 | Ludlum et al. | 427/157 |
| 4,703,572 A | * | 11/1987 | Chapin | 40/442 |
| 4,744,012 A | * | 5/1988 | Bergkvist | 362/84 |
| 5,005,873 A | * | 4/1991 | West | 283/92 |
| 5,172,937 A | * | 12/1992 | Sachetti | 283/81 |
| 5,416,674 A | * | 5/1995 | Murai | 362/84 |
| 5,580,055 A | * | 12/1996 | Hagiwara | 273/143 R |
| 5,766,074 A | * | 6/1998 | Cannon et al. | 463/16 |
| 5,780,124 A | * | 7/1998 | Ripstein | 428/29 |
| 5,867,586 A | * | 2/1999 | Liang | 382/112 |
| 5,902,670 A | * | 5/1999 | Ripstein | 428/206 |
| 6,027,115 A | * | 2/2000 | Griswold et al. | 273/143 R |
| 6,080,061 A | * | 6/2000 | Watanabe et al. | 463/16 |
| 6,206,781 B1 | * | 3/2001 | Sunaga et al. | 463/20 |
| 6,364,766 B1 | * | 4/2002 | Anderson et al. | 463/16 |
| 6,439,994 B2 | * | 8/2002 | Tsukahara | 463/20 |
| 7,335,101 B1 | * | 2/2008 | Luciano, Jr. | 463/16 |
| 2003/0013512 A1 | * | 1/2003 | Rowe | 463/20 |

(Continued)

FOREIGN PATENT DOCUMENTS

GB     2306746 A   *  5/1997

(Continued)

OTHER PUBLICATIONS

Durda, Frank. The Fluorescent Lighting System. 2002 [online] [Retrieved on Oct. 5, 2004], Retrieved from the Internet <URL: http://nemesis.lonestar.org/reference/electricity/fluorescent/lamps.html>.*

(Continued)

*Primary Examiner* — Peter DungBa Vo
*Assistant Examiner* — Damon Pierce
(74) *Attorney, Agent, or Firm* — Richard E. Billion; Clise, Billion & Cyr, P.A.

(57) ABSTRACT

A gaming machine has a display panel with permanent indicia and optionally also adapted for display of transient indicia which act with the permanent indicia as part of the gaming played on the machine. At least a portion of the permanent indicia may comprise an ink or other iridescent coating that glows in the presence of activating light, typically ultraviolet radiation. A source of the activating light is positioned to irradiate the permanent indicia portions. A controller is typically present for activating the activating light source in a predetermined manner which correlates with one or more events taking place in the particular game being played on the machine.

10 Claims, 2 Drawing Sheets

U.S. PATENT DOCUMENTS

2003/0073484 A1* 4/2003 Jo ................................ 463/20
2003/0109304 A1* 6/2003 Gauselmann ................ 463/30

FOREIGN PATENT DOCUMENTS

JP     6-105943    *   4/1994
JP     11-65502    *   3/1999

OTHER PUBLICATIONS

Sersen, William. Buying and Selling Gems: What Light is Best? Gemological Digest, vol. 3 1990, pp. 45-56. [online] [Retrieved on Oct. 5, 2004]. Retrieved from the Internet <URL: http:www.palagems.com/gem_lighting2.htm>.*

ESU Reptile DayLight Fluorescent Bulbs—Petluvers.com. [online] [Retrieved on Oct. 5, 2004]. Retrieved from the Internet <URL: http://www.petluvers.com/esureptiledaylightfluorescentbulbs.html>.*

Energy Savers Unlimited. Reptile Flourescent Lamp. [online]. [Retrieved on Oct. 5, 2004]. Retrieved from the Internet <URL: http:www.esuweb.com/products/578ESU_Reptile_Reptile_Fluorescent_Lamps_Super)U.V.>.*

"The Fluorescent Mineral Tables". Sep. 15, 2000. [online] [Retrieved on Oct. 7, 2005]. Retrieved from the Internet <URL: http://web.archive.org/web/2000915131721/http://mineral.galleries.com/minerals/property/fluotabl.htm>.*

"Mineral Resources: Fluorescence and Phosphorescence". Feb. 9, 2001. [online] [Retrieved on Oct. 7, 2005]. Retrieved from the Internet <URL: http:web.archive.org/web/20010209103204/http://www.minerals.net/resource/property/fluoresce.htm>.*

JP, 11-065502, A (1999), English Translation.*

Internet Website www.minerals.net/resource/property/fluoresc.htm; article entitled: Mineral Properties and identification procedures Fluorescence and Phosphorescence (2 pages); Jul. 16, 2004.

Internet Website www.mineral.galleries.com/minerals/property/fluotabl.htm; article entitled: The Fluorescent Mineral Tables (2 pages) Jul. 16, 2004.

Internet Website www.mineral.galleries.com/minerals/fluoresc.htm; article entitled: The Fluorescent Minerals (3 pages) Jul. 16, 2004.

* cited by examiner

GAMING MACHINE WITH IRIDESCENT OR FLUORESCENT INDICIA

BACKGROUND OF THE INVENTION

Gaming machines are of course for entertainment. Accordingly, it is desirable to increase the entertainment and excitement of the playing of the machines by adding a large variety of attractions and attention getting devices to the respective machines. By this invention, a strong "attention getter" is provided, in that indicia such as lines or figures on the machine can be highlighted by emitting a sudden glow of fluorescence or iridescence at times selected by the program of the game.

DESCRIPTION OF THE INVENTION

In accordance with this invention, a gaming machine is provided which comprises a housing and a display panel carried in the housing. The display panel carries permanent indicia, for example lines, figures, or the like. The display panel and gaming machine may also be adapted with appropriate components for the display of transient indicia, either on the display panel or visible through the display panel, as a part of the gaming played on the machine.

The permanent or transient indicia comprises an ink or other iridescent coating (for example iridescent ink, which is a commercially available material). These inks or other coatings are those that glow in the presence of activating light, such as ultraviolet light or equivalent radiation such as x-ray, infrared or the like, where energy from a radiation that is less visible (not necessarily totally invisible) is re-emitted at a more visible frequency or other manner, to provide a strong and even startling glow to the permanent indicia. However, it is of course possible that some of the permanent indicia will not be adapted to respond to irradiation with a glow. Some of the indicia may glow when irradiated at one frequency and other indicia may glow when irradiated at a second frequency to provide a variable pattern (and optionally variable color) of the responsive glow.

A source of the activating light is positioned to irradiate the permanent indicia.

Preferably, the gaming machine further comprises a controller for activating the (typically ultraviolet) light source in a predetermined manner which correlates with one or more events taking place in the particular game being played on the machine. For example, the gaming machine may be equipped to play a game having a bonus round. The controller accordingly may activate the light source upon occurrence of the bonus round as the game is played. Thus, the bonus round may be announced by the sudden illumination and glow of some of the indicia on the display panel, without apparent visible light to illuminate it since the activating radiation is preferably of reduced visibility.

Preferably, the display panel comprises a glass panel, and may further comprise a liquid crystal display screen or a video screen of the type commonly useable with gaming machines.

It is also possible for the source of activating ultraviolet (or equivalent) light to be within the housing, and to comprise a plurality of ultraviolet lights spaced from each other within the housing, to optimize the fluorescent or other glow provided to the permanent indicia at the appropriate moment as dictated by the game.

The permanent or transient indicia may if desired be made by different light activatable materials such as fluorescent materials, which fluoresce at different colors to provide a multiple color fluorescence.

The gaming machine may be operated by irradiating the display panel with a source of activating light positioned to irradiate the permanent indicia and optionally and/or optionally the transient indicia as desired while optionally shutting off the source of visible light. Then, the source of activating light may be shut off and the visible light turned on again.

It may be desirable to irradiate the indicia with two sources of activating light, one portion of the indicia being sensitive to light at one frequency and another portion of the indicia being sensitive to light of another frequency. Thus two different areas of irradiation may be created which glow sequentially or simultaneously as desired.

Furthermore, the indicia may be made of different materials, so that at least portions of the indicia may glow upon irradiation with different colors. Thus, the indicia may glow when irradiated by activating light both at different times, and in different colors.

Conventional lighting may be provided to the display panel, and this conventional lighting may work with the activating lighting in any desired way. The most dramatic way is to shut off the conventional lighting when the activating light is in use so that the entire scene darkens, highlighting the illuminated portions of the permanent indicia, the illumination being typically by a fluorescence in the presence of ultraviolet light.

DESCRIPTION OF THE DRAWINGS

Referring to the drawings.

DESCRIPTION OF SPECIFIC EMBODIMENTS

Figure 1:
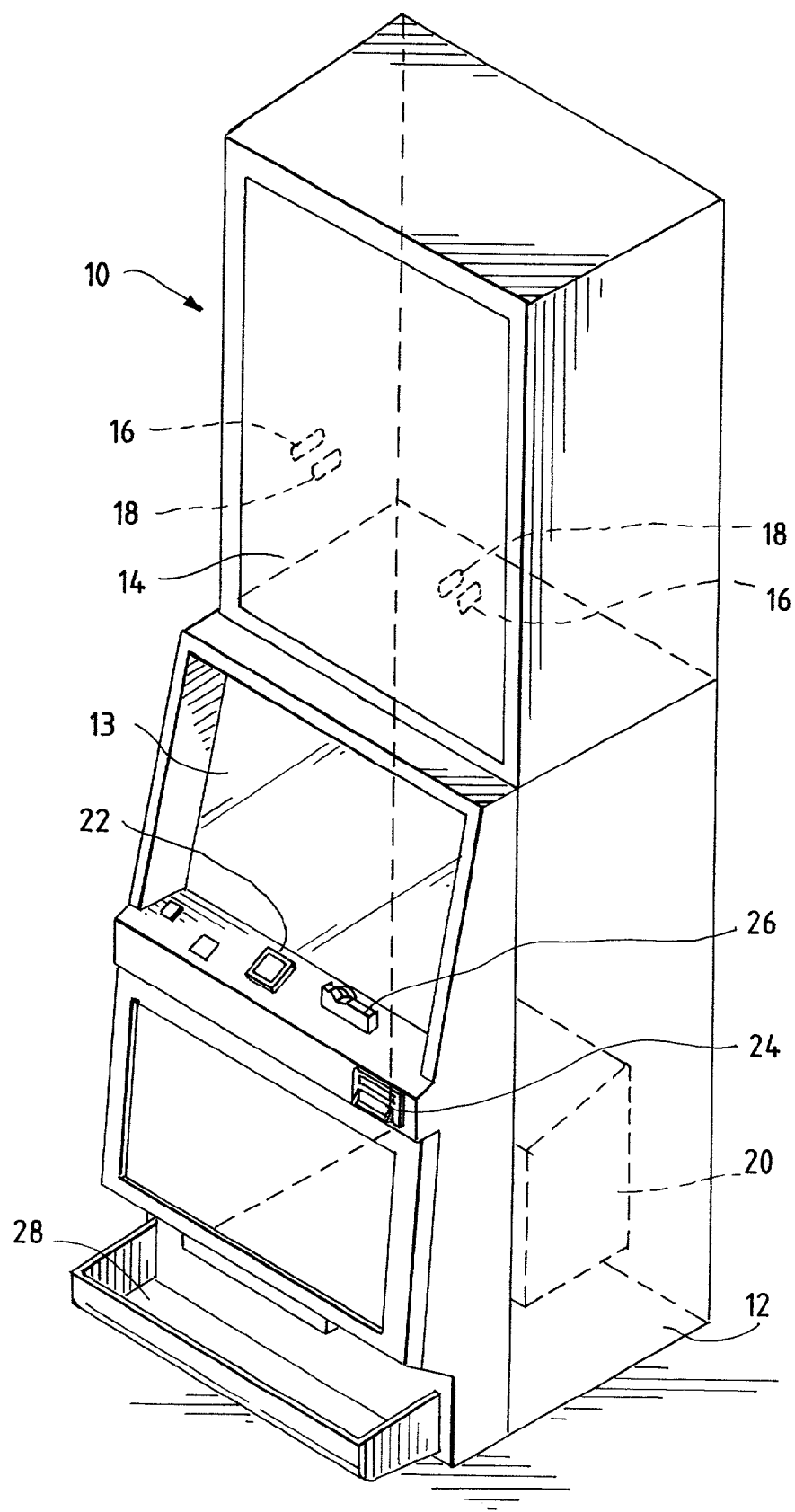
FIG. 1 is an elevational view of a gaming machine having a screen in accordance with this invention.

Referring to the drawings, gaming machine 10 is shown having a housing 12, which carries a screen 14. Conventional electronics and other equipment for operating a gaming machine is present in housing 12, including two, or any number, of internal activating lights 16 that emit ultraviolet radiation, and also two, or any number, of conventional fluorescent lights 18 emitting visible radiation. The gaming machine will carry a suitable microprocessor 20 for operation of the system plus control buttons 22 for the gamer's use, a bill slot 24, a coin entry slot 26, a payout trough 28, and other conventional equipment.

Figure 2:
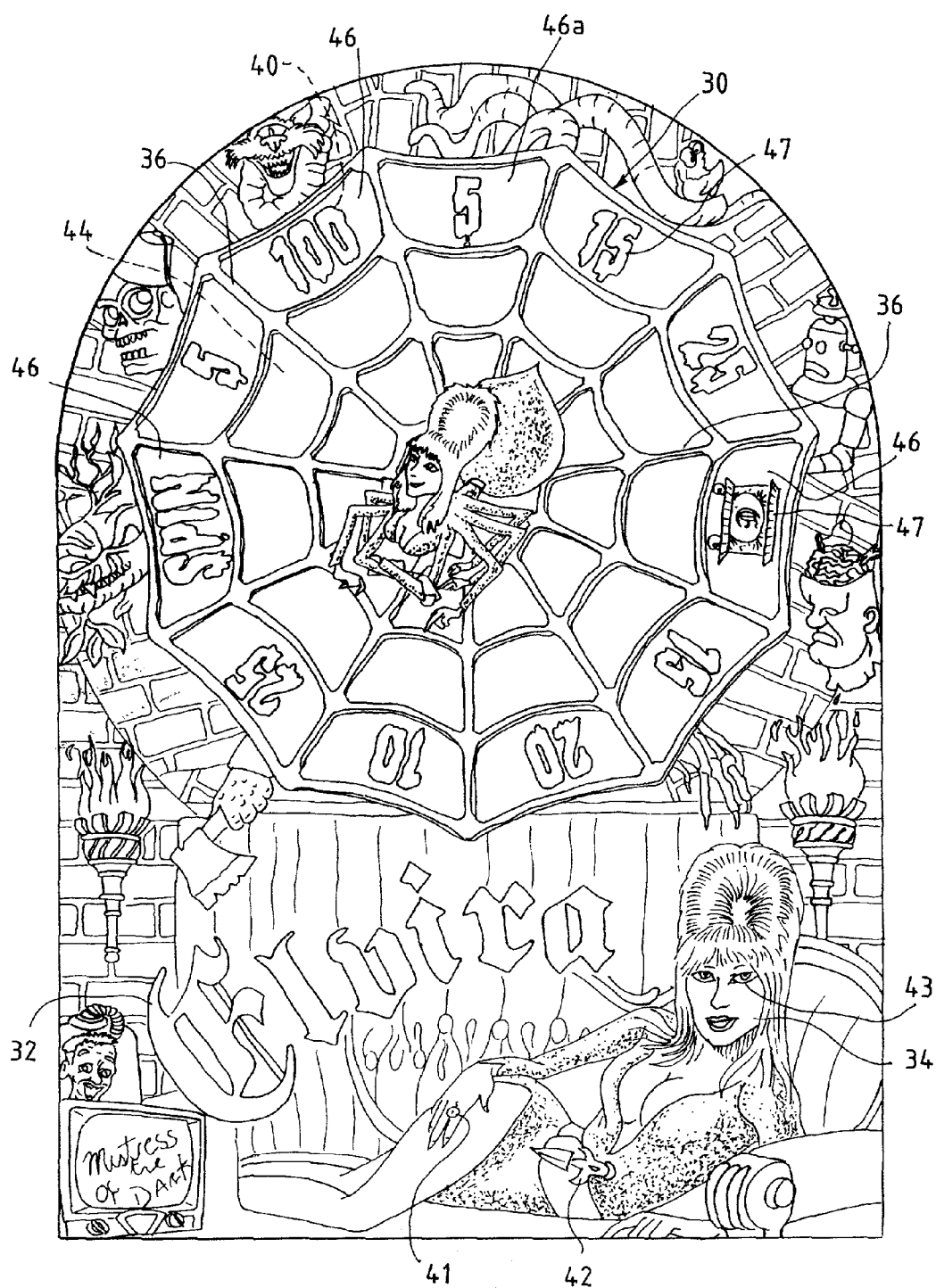
FIG. 2 is an elevational view of one screen in accordance with this invention, showing permanent indicia and transient indicia.

FIG. 2 shows screen 14 having permanent indicia 30 thereon, an example thereof being shown. The particular permanent indicia 30 of the specific embodiment disclosed comprises, among other things, the name of the game "ELVIRA" 32 in large letters, a figure of the lady herself 34, and a numbered spider web 36 on which the game is played. The symbol-bearing segments 46 of the game play area 44 may be illuminated by back lights 18. The symbols 47 found in segments 46 may comprise the transient indicia, being carried by a rotating back wheel 40, or by TV image technology or the like, in a changeable manner so that the numbers rotate through the segments 46. The winning number may occupy the top segment 46a when the rotation stops.

The gaming machine 10 may also have a lower portion 13 for use as a first game. If desired, the described use of fluorescent illumination or the like per this invention may be used with this screen as an addition or an alternative to the fluorescent illumination at screen 14.

The lower portion 13 may comprise a spinning rotator or an electronic simulation of a rotating reel "fruit machine", or video poker, or any other desired game, which may be played and, on occasion, won by the player. In this embodiment, when the lower game 13 is won, upper screen 14 with its permanent image 30 may be activated. Prior to this, the screen 14 may be back lit with the conventional visible lights 18. Upon activation of the upper screen 14 and its associated game, the internal ultraviolet lights 16 may turn on, and the visible lights 18 turned off, to cause fluorescence of those portions of the permanent indicia which are made of a fluorescent or iridescent ink or coating. As specifically shown, these fluorescent portions may comprise the spider web lines 36, ELVIRA'S ring 41, her dagger 42, her eyes 43, the name ELVIRA 32, (or lines outlining the letters of that name), and other portions as may be desired.

Other temporary indicia may be used, such as symbols or lighting on the play area that turn on and off to indicate positions and status of game playing, so that a given prize may be awarded depending upon the final position of the temporary indicia. Specifically, the temporary indicia comprise the numbers 47 on wheel 40. Games associated with upper screen 14 and gaming machine 10 generally may include a roulette like game with a spinning wheel, an electronic slot machine, video black-jack, video poker, or other gaming devices including rotating reel machines.

At the end of the playing on the game field with the permanent indicia 30, ultraviolet light or lights 16 may be shut off and visible lights 18 turned on again, for playing of the lower game portion 13.

Also, if desired, the permanent and/or transient indicia may remain illuminated with conventional lighting while the ultraviolet lights 16 illuminate various fluorescent portions of image 30. Also, the ultraviolet lights 16 may be on during the player-attracting phase of operation, when a game is not being played.

The gaming machine 10 may be activated by inserting a coin in a bill slot 24, a coin in a coin entry slot 26, depressing one or more control buttons 22, or a combination thereof. Upon activation of the gaming machine 10, the lower game 13 may be activated in combination with the upper screen 14. Upon activation of the upper screen 14 and its associated game, the internal ultraviolet lights 16 may turn on, and the visible lights 18 optionally turned off, to cause fluorescence of those portions of the indicia which are made of a fluorescent or iridescent ink or coating.

The lower game 13 may result in either a win or a loss. A win in the lower game 13 may result in a payout to be awarded in payout trough 28. After a win or loss results in the lower game 13, the associated game with upper screen 14 may enable play. A win in the game associated with upper screen 14 may also result in a payout to be awarded in payout trough 28.

At the end of playing on the game field having the permanent, fluorescent indicia 30, ultraviolet light or lights 16 may be shut off and visible lights 18 turned on again for playing of the lower game portion 13.

The above has been offered for illustrative purposes only, and is not intended to limit the scope of the invention of this application, which is as defined in the claims below.

That which is claimed is:

1. A gaming machine which comprises:
   a housing;
   said housing have a non-moveable display panel;
   said non-moveable display panel carrying a non-moveable permanent image that remains non-moveable as viewed by the player;
   said non-moveable permanent image comprising an iridescent ink or other iridescent coating that glows in the presence of ultraviolet light;
   a first source of ultraviolet light positioned to irradiate said non-moveable permanent image, said first source comprising ultraviolet light of a first frequency, with one portion of said non-moveable permanent image being sensitive to ultraviolet light at said first frequency;
   a second source of ultraviolet light comprising ultraviolet light of a different frequency from said first frequency, with another portion of said non-moveable permanent Image being sensitive to ultraviolet light at said other frequency, to provide different responses to ultraviolet irradiation by the respective non-moveable permanent image portions; and
   a controller for activating said ultraviolet light sources in a predetermined manner correlating with one or more events taking place in a particular game being played on said machine in which said gaming machine is equipped to play a game having a bonus round, said controller activating said ultraviolet light sources upon occurrence of the bonus round as the game is playing.

2. A gaming machine which comprises:
   a housing;
   said housing have a non-moveable display panel;
   said non-moveable display panel carrying a non-moveable permanent image that remains non-moveable as viewed by the player;
   said non-moveable permanent image comprising an iridescent ink or other iridescent coating that glows in the presence of ultraviolet light;
   a first source of ultraviolet light positioned to irradiate said non-moveable permanent image, said first source comprising ultraviolet light of a first frequency, with one portion of said non-moveable permanent image being sensitive to ultraviolet light at said first frequency;
   a second source of ultraviolet light comprising ultraviolet light of a different frequency from said first frequency, with another portion of said non-moveable permanent Image being sensitive to ultraviolet light at said other frequency, to provide, different responses to ultraviolet irradiation by the respective non-moveable permanent image portions; and
   a controller for activating said ultraviolet light sources in a predetermined manner correlating with one or more events taking place in a particular game being played on said machine in which the display panel comprises a glass partition.

3. A gaming machine which comprises:
   a housing;
   said housing have a non-moveable display panel;
   said non-moveable display panel carrying a non-moveable permanent image that remains non-moveable as viewed by the player;
   said non-moveable permanent image comprising an iridescent ink or other iridescent coating that glows in the presence of ultraviolet light;
   a first source of ultraviolet light positioned to irradiate said non-moveable permanent image, said first source comprising ultraviolet light of a first frequency, with one portion of said non-moveable permanent image being sensitive to ultraviolet light at said first frequency;
   a second source of ultraviolet light comprising ultraviolet light of a different frequency from said first frequency, with another portion of said non-moveable permanent Image being sensitive to ultraviolet light at said other frequency, to provide, different responses to ultraviolet irradiation by the respective non-moveable permanent image portions; and a controller for activating said ultraviolet light sources in a predetermined manner correlating with one or more events taking place in a particular game being played on said machine in which said sources of ultraviolet light comprise a plurality of ultraviolet lights spaced from each other within said housing.

4. A gaming machine which comprises:

a housing;

said housing have a non-moveable display panel;

said non-moveable display panel carrying a non-moveable permanent image that remains non-moveable as viewed by the player;

said non-moveable permanent image comprising an iridescent ink or other iridescent coating that glows in the presence of ultraviolet light;

a first source of ultraviolet light positioned to irradiate said non-moveable permanent image, said first source comprising ultraviolet light of a first frequency, with one portion of said non-moveable permanent image being sensitive to ultraviolet light at said first frequency;

a second source of ultraviolet light comprising ultraviolet light of a different frequency from said first frequency, with another portion of said non-moveable permanent Image being sensitive to ultraviolet light at said other frequency, to provide different responses to ultraviolet irradiation by the respective non-moveable permanent image portions; and a controller for activating said ultraviolet light sources in a predetermined manner correlating with one or more events taking place in a particular game being played on said machine in which said display panel comprises a liquid crystal display screen.

5. A gaming machine which comprises:

a housing;

said housing have a non-moveable display panel;

said non-moveable display panel carrying a non-moveable permanent image that remains non-moveable as viewed by the player;

said non-moveable permanent image comprising an iridescent ink or other iridescent coating that glows in the presence of ultraviolet light;

a first source of ultraviolet light positioned to irradiate said non-moveable permanent image, said first source comprising ultraviolet light of a first frequency, with one portion of said non-moveable permanent image being sensitive to ultraviolet light at said first frequency;

a second source of ultraviolet light comprising ultraviolet light of a different frequency from said first frequency, with another portion of said non-moveable permanent Image being sensitive to ultraviolet light at said other frequency, to provide different responses to ultraviolet irradiation by the respective non-moveable permanent image portions; and a controller for activating said ultraviolet light sources in a predetermined manner correlating with one or more events taking place in a particular game being played on said machine which is adapted for display of transient indicia in addition to said non-moveable permanent image as a part of the gaming played on said machine.

6. A gaming machine which comprises:

a housing;

said housing have a non-moveable display panel;

said non-moveable display panel carrying a non-moveable permanent image that remains non-moveable as viewed by the player;

said non-moveable permanent image comprising an iridescent ink or other iridescent coating that glows in the presence of ultraviolet light;

a first source of ultraviolet light positioned to irradiate said non-moveable permanent image, said first source comprising ultraviolet light of a first frequency, with one portion of said non-moveable permanent image being sensitive to ultraviolet light at said first frequency;

a second source of ultraviolet light comprising ultraviolet light of a different frequency from said first frequency, with another portion of said non-moveable permanent Image being sensitive to ultraviolet light at said other frequency, to provide different responses to ultraviolet irradiation by the respective non-moveable permanent image portions; and a controller for activating said ultraviolet light sources in a predetermined manner correlating with one or more events taking place in a particular game being played on said machine; and a visible light source for illuminating said non-moveable display panel, the gaming machine in which said gaming machine is equipped to play a game having a bonus round, said controller activating said ultraviolet light sources upon occurrence of the bonus round as the game is playing.

7. A gaming machine which comprises:

a housing;

said housing have a non-moveable display panel;

said non-moveable display panel carrying a non-moveable permanent image that remains non-moveable as viewed by the player;

said non-moveable permanent image comprising an iridescent ink or other iridescent coating that glows in the presence of ultraviolet light;

a first source of ultraviolet light positioned to irradiate said non-moveable permanent image, said first source comprising ultraviolet light of a first frequency, with one portion of said non-moveable permanent image being sensitive to ultraviolet light at said first frequency;

a second source of ultraviolet light comprising ultraviolet light of a different frequency from said first frequency, with another portion of said non-moveable permanent Image being sensitive to ultraviolet light at said other frequency, to provide different responses to ultraviolet irradiation by the respective non-moveable permanent image portions; and a controller for activating said ultraviolet light sources in a predetermined manner correlating with one or more events taking place in a particular game being played on said machine; and a visible light source for illuminating said non-moveable display panel, the gaming machine in which the display panel comprises a glass partition.

8. A gaming machine which comprises:

a housing;

said housing have a non-moveable display panel;

said non-moveable display panel carrying a non-moveable permanent image that remains non-moveable as viewed by the player;

said non-moveable permanent image comprising an iridescent ink or other iridescent coating that glows in the presence of ultraviolet light;

a first source of ultraviolet light positioned to irradiate said non-moveable permanent image, said first source comprising ultraviolet light of a first frequency, with one portion of said non-moveable permanent image being sensitive to ultraviolet light at said first frequency;

a second source of ultraviolet light comprising ultraviolet light of a different frequency from said first frequency, with another portion of said non-moveable permanent Image being sensitive to ultraviolet light at said other frequency, to provide different responses to ultraviolet irradiation by the respective non-moveable permanent image portions; and a controller for activating said ultraviolet light sources in a predetermined manner correlating with one or more events taking place in a particular game being played on said machine; and a visible light source for illuminating said non-moveable display panel, the gaming machine in which said sources of ultraviolet light comprise a plurality of ultraviolet lights spaced from each other within said housing.

9. A gaming machine which comprises:
a housing;
said housing have a non-moveable display panel;
said non-moveable display panel carrying a non-moveable permanent image that remains non-moveable as viewed by the player;
said non-moveable permanent image comprising an iridescent ink or other iridescent coating that glows in the presence of ultraviolet light;
a first source of ultraviolet light positioned to irradiate said non-moveable permanent image, said first source comprising ultraviolet light of a first frequency, with one portion of said non-moveable permanent image being sensitive to ultraviolet light at said first frequency;
a second source of ultraviolet light comprising ultraviolet light of a different frequency from said first frequency, with another portion of said non-moveable permanent Image being sensitive to ultraviolet light at said other frequency, to provide different responses to ultraviolet irradiation by the respective non-moveable permanent image portions; and
a controller for activating said ultraviolet light sources in a predetermined manner correlating with one or more events taking place in a particular game being played on said machine; and
a visible light source for illuminating said non-moveable display panel, the gaming machine in which said display panel comprises a liquid crystal display screen.

10. A gaming machine which comprises:
a housing;
said housing have a non-moveable display panel;
said non-moveable display panel carrying a non-moveable permanent image that remains non-moveable as viewed by the player;
said non-moveable permanent image comprising an iridescent ink or other iridescent coating that glows in the presence of ultraviolet light;
a first source of ultraviolet light positioned to irradiate said non-moveable permanent image, said first source comprising ultraviolet light of a first frequency, with one portion of said non-moveable permanent image being sensitive to ultraviolet light at said first frequency;
a second source of ultraviolet light comprising ultraviolet light of a different frequency from said first frequency, with another portion of said non-moveable permanent Image being sensitive to ultraviolet light at said other frequency, to provide different responses to ultraviolet irradiation by the respective non-moveable permanent image portions; and
a controller for activating said ultraviolet light sources in a predetermined manner correlating with one or more events taking place in a particular game being played on said machine; and
a visible light source for illuminating said non-moveable display panel, the gaming machine which is adapted for display of transient indicia in addition to said non-moveable permanent image as a part of the gaming played on said machine.

* * * * *